US008620032B2

(12) United States Patent
Zeng

(10) Patent No.: US 8,620,032 B2
(45) Date of Patent: Dec. 31, 2013

(54) SYSTEM AND METHOD FOR TRAFFIC SIGNAL DETECTION

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 13/104,220

(22) Filed: May 10, 2011

(65) Prior Publication Data

US 2012/0288138 A1 Nov. 15, 2012

(51) Int. Cl.
*G06K 9/00* (2006.01)

(52) U.S. Cl.
USPC ............................ 382/104; 340/907; 340/933

(58) Field of Classification Search
USPC .................................. 382/104; 340/907–933
See application file for complete search history.

(56) References Cited

U.S. PATENT DOCUMENTS

| | | | | |
|---|---|---|---|---|
| 6,343,247 | B2 * | 1/2002 | Jitsukata et al. | 701/28 |
| 6,720,889 | B2 | 4/2004 | Yamaki et al. | |
| 6,850,170 | B2 | 2/2005 | Neff | |
| 7,058,206 | B1 | 6/2006 | Janssen et al. | |
| 7,398,076 | B2 | 7/2008 | Kubota | |
| 7,587,271 | B2 | 9/2009 | Kiim | |
| 7,646,311 | B2 * | 1/2010 | Afzulpurkar et al. | 340/934 |
| 7,696,903 | B2 | 4/2010 | Stam | |
| 7,899,213 | B2 * | 3/2011 | Otsuka et al. | 382/104 |
| 8,134,480 | B2 * | 3/2012 | Onome et al. | 340/937 |
| 8,170,286 | B2 * | 5/2012 | Kashimura et al. | 382/104 |
| 8,248,220 | B2 * | 8/2012 | Nagamine et al. | 340/435 |
| 8,254,635 | B2 * | 8/2012 | Stein et al. | 382/103 |
| 8,324,552 | B2 * | 12/2012 | Schofield et al. | 250/208.1 |
| 2003/0016143 | A1 | 1/2003 | Ghazgrian | |
| 2005/0122235 | A1 * | 6/2005 | Teffer et al. | 340/937 |
| 2006/0269104 | A1 * | 11/2006 | Ciolli | 382/104 |
| 2007/0263902 | A1 * | 11/2007 | Higuchi et al. | 382/104 |
| 2008/0059055 | A1 * | 3/2008 | Geelen et al. | 701/201 |
| 2008/0205705 | A1 * | 8/2008 | Kashimura et al. | 382/104 |
| 2008/0218379 | A1 | 9/2008 | Boss et al. | |
| 2009/0174573 | A1 | 7/2009 | Smith | |
| 2009/0295598 | A1 | 12/2009 | Denaro | |
| 2009/0303077 | A1 * | 12/2009 | Onome et al. | 340/901 |
| 2010/0109908 | A1 | 5/2010 | Miura | |
| 2010/0207787 | A1 | 8/2010 | Catten et al. | |
| 2011/0135155 | A1 * | 6/2011 | Kudo | 382/104 |
| 2011/0182475 | A1 * | 7/2011 | Fairfield et al. | 382/104 |
| 2012/0134532 | A1 * | 5/2012 | Ni et al. | 382/103 |
| 2012/0288138 | A1 * | 11/2012 | Zeng | 382/103 |

FOREIGN PATENT DOCUMENTS

| | | |
|---|---|---|
| DE | 29802953 | 5/1998 |
| EP | 1096457 | 5/2001 |
| ES | 2231001 | 5/2005 |

* cited by examiner

*Primary Examiner* — Jayesh A Patel
*Assistant Examiner* — Iman K Kholdebarin
(74) *Attorney, Agent, or Firm* — Mark S. Cohen; Pearl Cohen Zedek Latzer Baratz LLP

(57) ABSTRACT

A method and system may determine a location of a vehicle, collect an image using a camera associated with the vehicle, analyze the image in conjunction with the location of the vehicle and/or previously collected information on the location of traffic signals or other objects (e.g., traffic signs), and using this analysis locate an image of a traffic signal within the collected image. The position (e.g., a geographic position) of the signal may be determined, and stored for later use. The identification of the signal may be used to provide an output such as the status of the signal, such as green light.

17 Claims, 5 Drawing Sheets

SYSTEM AND METHOD FOR TRAFFIC SIGNAL DETECTION

FIELD OF THE INVENTION

The present invention is related to detecting traffic related objects or signal devices such as traffic lights using, for example, a combination of location knowledge, previously detected object knowledge and imaging.

BACKGROUND

A high percentage of traffic (e.g., automobile) accidents occur at intersections, and a portion of these accidents result from drivers not being aware of traffic signals. Providing information regarding traffic signals to drivers and making drivers aware of such signals before or at the time a vehicle approaches such signals may help drivers avoid such accidents. In addition, inputting information regarding such signals into systems such as autonomous adaptive cruise control (ACC) may help the performance of such systems.

Information on traffic signals can be provided by automated computer image analysis of images captured from, for example, a camera pointed in the direction of travel. However, such analysis may be inaccurate and take more time than is available in a fast-moving vehicle.

SUMMARY

A method and system may determine a location of a vehicle, collect an image using a camera associated with the vehicle, analyze the image in conjunction with the location of the vehicle and/or previously collected information on the location of traffic signals or other objects (e.g., traffic signs), and using this analysis locate an image of a traffic signal within the collected image. The position of the signal may be determined, and stored for later use. The identification of the signal may be used to provide an output such as the status of the signal (e.g., green light).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
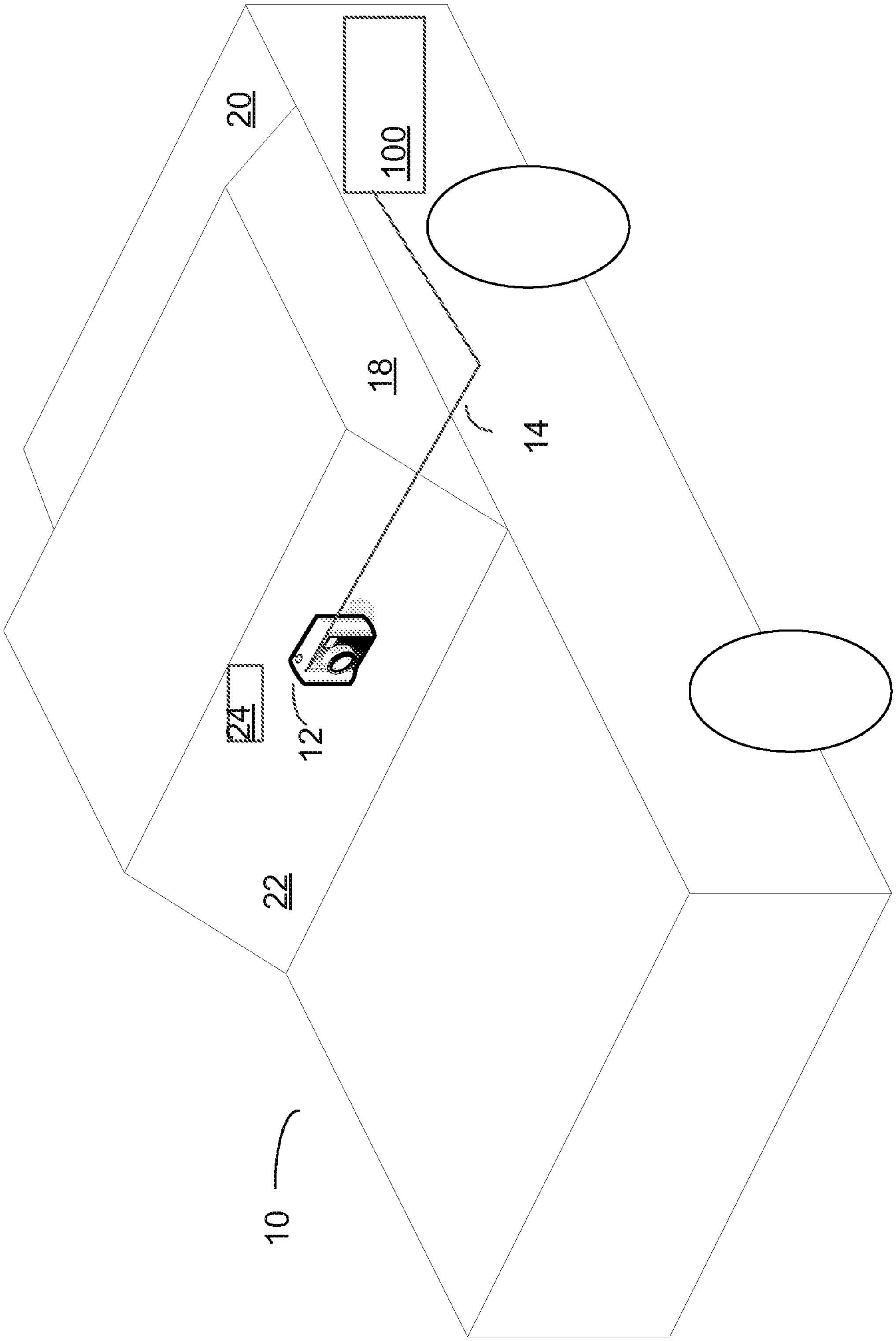
FIG. 1 is a schematic diagram of a vehicle and a signal detection system according to an embodiment of the present invention.

Reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may combine location information of a vehicle (and related information such as direction of travel, speed, acceleration, heading, yaw, etc.) and visual information such as images taken from a camera in the vehicle to locate (e.g., determine an absolute location and/or location in images) signal devices such as traffic signals. When used herein, a traffic signal may include a traffic light, such as a traditional traffic light with three or another numbers of lamps, e.g. red, yellow and green, or other traffic, train, vehicle, or other signaling devices. Previously collected, obtained or input knowledge regarding, for example, the geometry of a road or intersection and the location of traffic signals may be used to locate signals within an image. Images may be collected, for example, using a camera such as a digital camera, mounted on the vehicle. The camera is typically facing forward, in the direction of typical travel, and may be mounted for example on the front of a rear-view mirror, or in another suitable location. The vehicle is typically a motor vehicle such as a car, van, or truck, but embodiments of the invention may be used with other vehicles. Location information may come from a vehicle location detection system such as a global positioning system (GPS) information, dead reckoning information (e.g., wheel speed, accelerometers, etc.), or other information.

While signals are described as being detected, other road or traffic related objects may be detected using embodiments of the present invention. For example, traffic signs, bridges, exit ramps, numbers of lanes, road shoulders, or other objects may be detected.

When discussed herein, the position, point of view, heading or direction, and other position and orientation data of the camera is typically interchangeable with that of the vehicle. When used herein, the distance and angle from the vehicle is typically the distance and angle from the camera, since images are captured by the camera mounted in the vehicle.

The location information and the previously collected or obtained information may be used to inform the image analysis. Prepared, preexisting or publicly available map information, such as Navteq maps or maps provided by Google may also be used. In some embodiments this may make the image analysis quicker and/or more accurate, although other or different benefits may be realized. For example, information may be input or obtained regarding an area such as an intersection having traffic signals. This information may be obtained during the vehicle's previous travel through the intersection. The geometry of the intersection, including the location of known traffic signals may be known. Information on the location of previously identified traffic signals may be combined with the currently known location information of the vehicle to identify likely regions within images collected by the vehicle to determine the location of traffic signals. Images captured by the camera may be analyzed for signals in conjunction with the location of the vehicle and known map data or knowledge about the location of intersections and/or previously collected information on the location of signals to locate an image of a traffic signal within the collected image.

In some embodiments, with each pass through an area, road section, or intersection, more information may be gathered, and thus with each successive pass more accurate and/or faster image analysis may be performed. Signal location information may be stored, and the amount of such information may increase as more signals are detected.

After signal devices such as traffic signals are identified within images, they can be analyzed to determine their status or state (e.g., stop, yellow light, green light, no left turn, left turn permitted, etc.). This state can be displayed or provided to a driver or other user, such as via a display, an alarm, an audible tone, etc. This state can be provided to an automatic process such as an ACC to cause the vehicle to automatically slow down.

FIG. 1 is a schematic diagram of a vehicle and a signal detection system according to an embodiment of the present invention. Vehicle 10 (e.g. an automobile, a truck, or another vehicle) may include a signal detection system 100. A camera 12 in or associated with the vehicle, e.g., a digital camera capable of taking video and/or still images, may obtain images and transfer the images via, e.g., a wire link 14 or a wireless link to signal detection system 100. Camera 12 is typically forward facing, e.g., facing in the direction of typical travel, images through windshield 22, and may be for example mounted to rear view mirror 24, but may be positioned in another location, e.g. outside passenger compartment 18. More than one camera may be used, obtaining images from different points of view.

In one embodiment signal detection system 100 is or includes a computing device mounted on the dashboard of the vehicle in passenger compartment 18 or in trunk 20, and may be part of, associated with, accept location information from, or include a conventional vehicle location detection system such as a GPS. In alternate embodiments, signal detection system 100 may be located in another part of the vehicle, may be located in multiple parts of the vehicle, or may have all or part of its functionality remotely located (e.g., in a remote server).

Figure 2:
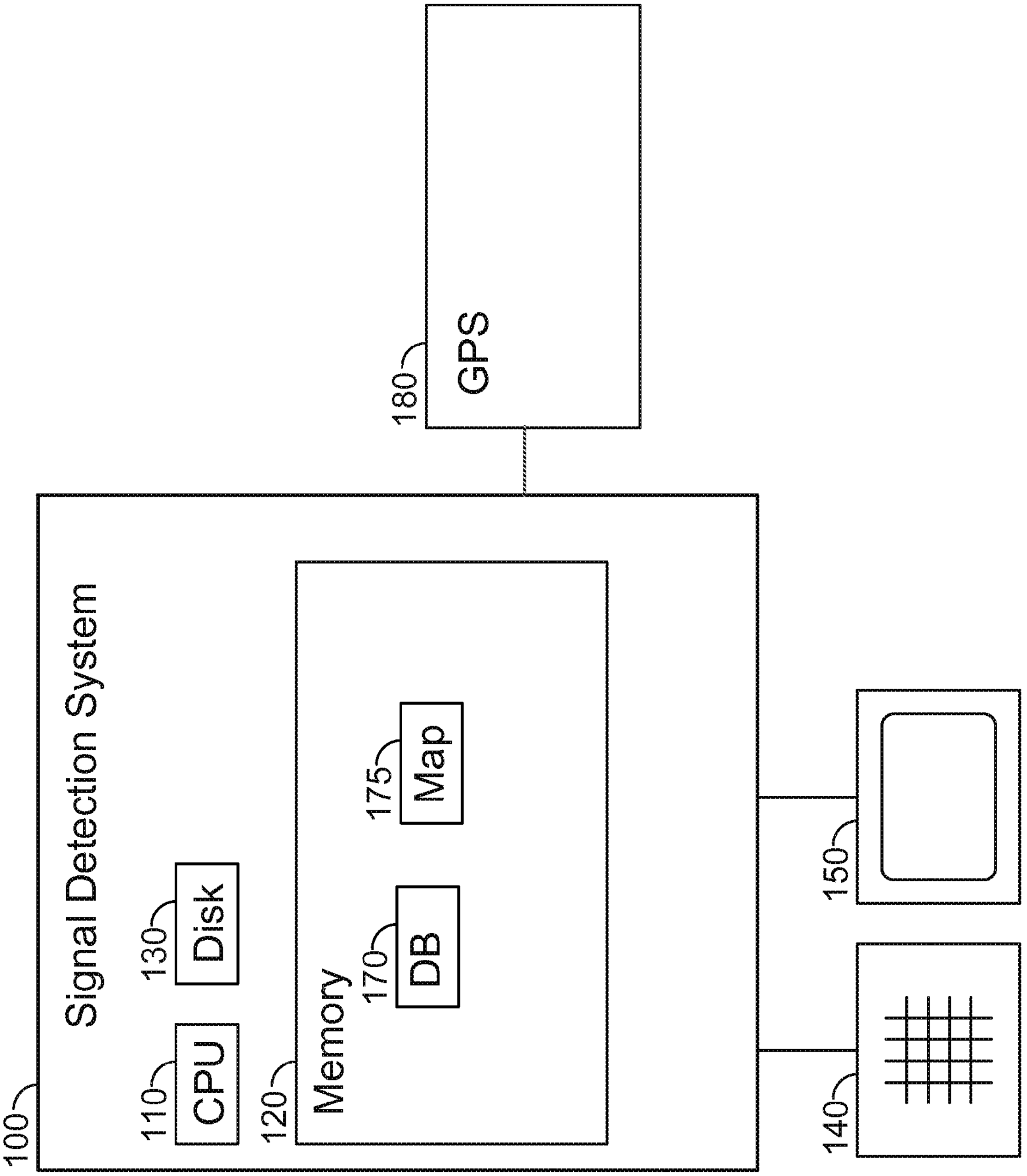
FIG. 2 is a schematic diagram of a signal detection system according to an embodiment of the present invention.

FIG. 2 is a schematic diagram of a signal detection system according to an embodiment of the present invention. Signal detection system 100 may include one or more processor(s) or controller(s) 110, memory 120, long term storage 130, input device(s) or area(s) 140, and output device(s) or area(s) 150. Input device(s) or area(s) 140 may be, for example, a touchscreen, a keyboard, microphone, pointer device, or other device. Output device(s) or area(s) 150 may be for example a display, screen, audio device such as speaker or headphones, or other device. Input device(s) or area(s) 140 and output device(s) or area(s) 150 may be combined into, for example, a touch screen display and input which may be part of system 100. Signal detection system 100 may include, be associated with, or be connected to GPS system 180, or another system for receiving or determining location information, e.g., for vehicle 10. GPS system 180 may be located in the vehicle in a location separate from system 100.

System 100 may include one or more databases 170 which may include, for example, information on each signal (e.g., traffic or other signal) encountered previously, including the geographic or three-dimensional (3D) location of the signal. The geographic or 3D location of an object such as a signal, a vehicle, or an object identified in an image may be, for example, in a format or location used in GPS systems, an x, y, z coordinate set, or other suitable location information. Other information on signals may be stored, such as image patches of detected traffic signals, a confidence value regarding the existence of the signal, a history of previous estimations or measurements for signal locations, or Gaussian distributions of a signal location or estimated locations related to a signal. Databases 170 may be stored all or partly in one or both of memory 120, long term storage 130, or another device. System 100 may include map data 175, although such data may be accessible remotely and may be stored separately from system 100.

Processor or controller 110 may be, for example, a central processing unit processor (CPU), a chip or any suitable computing or computational device. Processor or controller 110 may include multiple processors, and may include general purpose processors and/or dedicated processors such as graphics processing chips. Processor 110 may execute code or instructions, for example stored in memory 120 or long term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Memory 120 and/or long term storage 130 and/or other storage devices may store the geometry of intersections or other areas to which the vehicle 10 has visited, which may include for example the location coordinates (e.g., X/Y/Z coordinates, GPS coordinates) of signals. Signal positions may be stored as for example longitude, latitude, and height or elevation. Vehicle location data may include a heading, and thus may include for example six numbers, such as longitude, latitude, and height or elevation and heading data, which may include three numbers. Other methods and systems for representing signal location and vehicle location and/or heading may be used. In one embodiment, the system assumes the signal is facing the oncoming traffic (e.g., the vehicle hosting the system).

In some embodiments, signal data collected by a vehicle is useful or relevant to the particular vehicle collecting the data, and thus is "developed" or captured by a particular vehicle for use by a system 100 in that particular vehicle.

Figure 3:
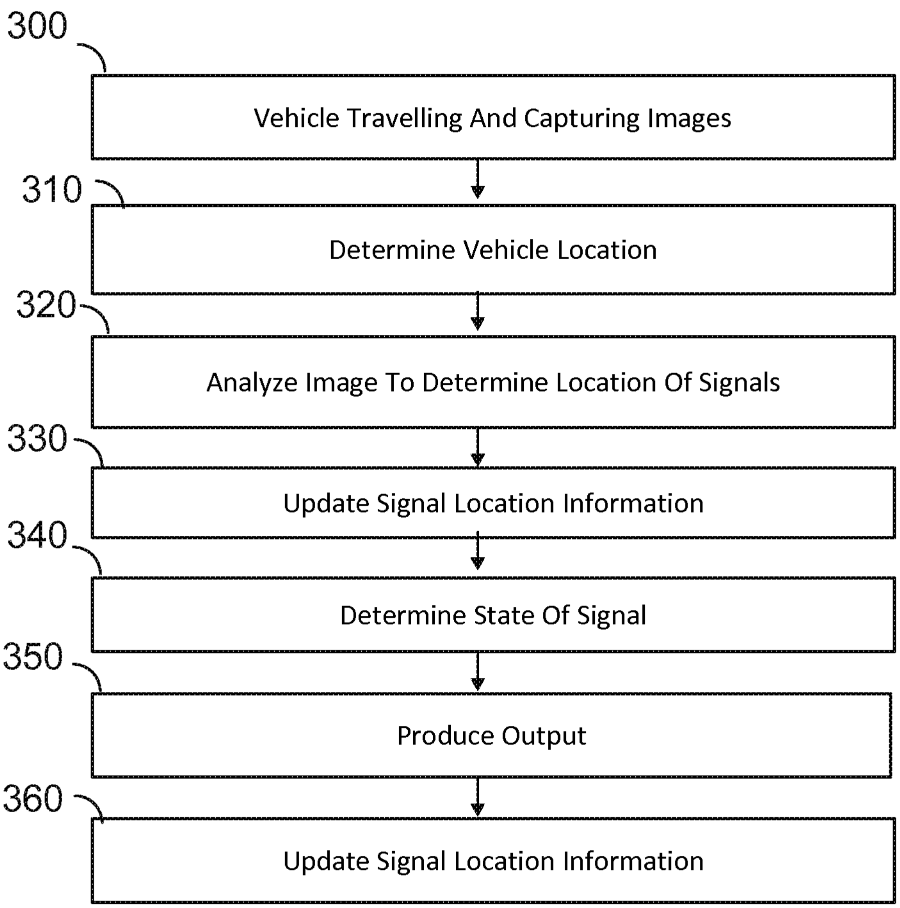
FIG. 3 is a flowchart depicting a method according to an embodiment of the invention.

FIG. 3 is a flowchart depicting a method according to an embodiment of the invention. The operations of FIG. 3 may be carried out by, for example the system described with respect to FIGS. 1 and 2, but may be carried out by other systems and devices.

In operation 300, a vehicle may be travelling, and may be capturing or collecting images, typically in the forward direction. Images may be collected at regular intervals, for example every 100 milliseconds, or at other intervals. Images may be captured as video. For example, a camera or cameras in or associated with the vehicle, e.g., one or more forward facing cameras, such as camera 12, may capture images.

In operation 310, the location of the vehicle may be determined, e.g., by accepting a location of a vehicle from a vehicle location detection system such as a GPS (e.g. system 180), by dead reckoning, or a combination of systems.

In operation 320, a captured image may be analyzed, images of signal devices may be detected and located within the captured image, and the location (e.g. geographic location) of the detected signals may be determined. This may be done, for example, by known object recognition techniques, based for example on known templates or characteristics of signals such as traffic signals. Since in different jurisdictions signals may look different, in different applications, locations or jurisdictions, different specific templates or characteristics may be used. Images may be analyzed and signal detection may be done with or in conjunction with input such as geographic map input provided by Navteq or Google. Images may be analyzed and signal detection may be done with or in conjunction with intersection information or signal location information previously obtained by a system within the vehicle; such information may be relevant to the specific vehicle and stored within or for the specific vehicle. An example procedure for the detection of signal devices within an image is provided with respect to FIG. 4.

The result of signal detection may include, for example, an image of the signal, or the position of the signal within an image, and the geographic location of the signal.

In operation 330, if a signal is detected or if a positive determination that a traffic signal exists made in operation 320, signal location information stored in a system in the vehicle may be updated. Such updating may include, for example, storing in a database (e.g., database 170) or other data structure, or a memory or long-term storage device, an entry for the signal and its geographic location. Such updating may include, for example, adjusting previously stored geographic location for a signal. Such updating may include noting that a signal was detected at or near a location more than once (or the number of times it was detected). Such updating may include storing information on newly detected traffic signals. Signals previously undetected for a site, due to image quality problems, processing limitations, or other reasons, may be added to a database. Signals whose location was erroneously calculated previously, or which have been moved, may have their location altered in the database.

Signal position information may be represented in GPS coordinates x (e.g., latitude, longitude, and height), and may include a corresponding covariance matrix (P). A new or updated measurement position z may be in the same coordinate system with a covariance matrix (M).

The Gaussian distribution N(x, P) for the signal position may be denoted as $[R_p, z_p]$ with $P=R_p^{-1}R_p^{-T}$ and $z_p=R_pX$. Similarly, the Gaussian distribution N(z,M) for the new measurement z may be denoted as $[R_M, z_M]$. The combined, updated or new estimate for the signal position $[\hat{R}_p, \hat{z}_p]$ can be computed as $\hat{x}=(R_p^TR_p+R_M^TR_M)^{-1}(R_p^Tz_p+R_M^Tz_M)$, where $\hat{R}_p$ is the Cholesky decomposition factor of the matrix $R_p^TR_p+R_M^TR_M$.

Other calculations may be used to update a signal position based on new information.

In operation 340 the state or status of the signal may be determined. The status may be for example, red (stop), yellow (slow), green (go), right turn, left turn, no right turn, no left turn, inoperative or error (e.g., in the case of a power outage or a faulty traffic signal) or other statuses or states. Different jurisdictions may have different inputs or images associated with different statuses—for example, in some jurisdictions a yellow light means slow down, and in others, a yellow light means the signal will soon change to green or "go". The specific location of the image in which a signal was detected may be analyzed for known colors or shapes (e.g., green, red, yellow) relevant to specific statuses for the relevant jurisdiction or area.

In operation 350 an output may be produced or the status may be used. For example, the status or state may be presented to a user in the form of a display or signal, for example via output device(s) or area(s) 150 (e.g., an audio signal from a speaker in the dashboard or driver's compartment stating "stop"). The status may be input to an automated system such as an ACC. The status may cause such an automated system, or a driver, to slow or stop the car. An intersection traffic light violation alert may be presented to the user if a red or stop is detected in the signal and the driver does not stop or begin to stop.

In operation 360, if a traffic light is not detected or if a negative determination regarding the existence a traffic signal is made in operation 320, signal location information stored in a system in the vehicle may be updated. In one embodiment, each signal may be associated in a database with a confidence value. If the expected signal is not detected, the confidence value may be decreased. If the confidence value is below a threshold, the corresponding signal entry may be removed from the database. If an expected signal is detected, the confidence value may be increased.

Other operations or series of operations may be used. The operations need not take place in the order presented; the order presented is for the purposes of organizing this description. For example, vehicle location information may be collected on a continual or periodic basis, and image collection may take place on a continual or periodic basis, and vehicle location information collection need not take place after image collection and analysis.

In one embodiment, the forward-looking camera has its position calibrated to refer to the phase center of the GPS antenna associated with the vehicle. Each pixel in the image may correspond to a relative position from, e.g., the antenna position (e.g., longitudinal and lateral displacements from the GPS antenna position), assuming the height of the corresponding real-world point is known. If the height is unknown, multiple measurements of the signal position in an image plane (e.g., the row and column of the signal) from a sequence of images captured from the vehicle at known positions can be used to determine the height.

Geographic map input, defining geographic features such as roads and intersections (e.g., where two or more roads meet), may be combined with location information of the vehicle or of imaged objects to weight the likelihood of the occurrence of a signal within an image and/or to weight a detection process. Location information of the vehicle may be assigned to each image, or to objects identified within the image. The location information assigned to an image may be that of the vehicle at the time the image was captured—objects depicted in the image may themselves have different location information. If the GPS information assigned to an image, or associated with objects in the image, does not correspond with an intersection, according to a map, the feature extraction process may be weighted to lower the likelihood of the detection of a signal (of course, clear recognition of a signal in the image may override this). If the GPS information assigned to an image, or associated with objects in the image, does correspond with an intersection, according to a map, the feature extraction process may be weighted to raise the likelihood of the detection of a signal.

Information on the location of signals previously collected by a system in the vehicle may be combined with location information of the vehicle or of objects in images captured to weight the likelihood of the occurrence of a signal within an image and also at specific locations within an image. Regions of an image to be analyzed may be assigned a geographic location based on the location of the vehicle at the time of image capture and the estimated distance and relative location from the vehicle of the candidate signal. The location data may be compared with previously collected signal location to increase or decrease the weighting for an area to determine if the area will be used in a signal detection process.

Figure 4:
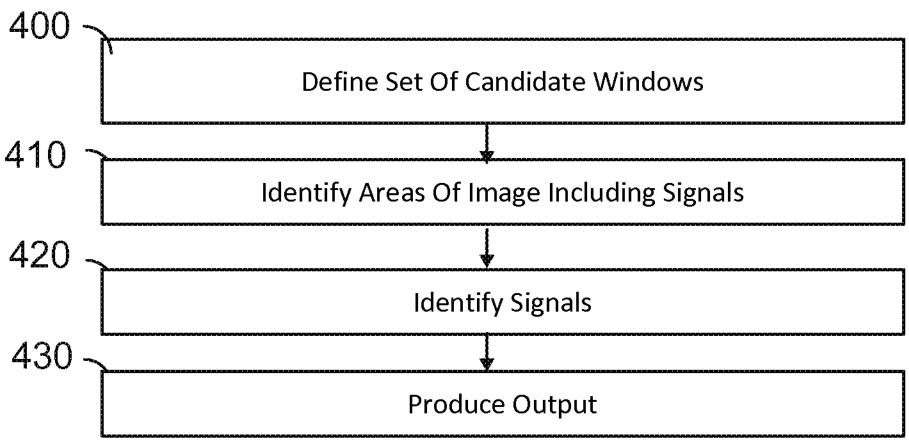
FIG. 4 is a flowchart depicting a method according to an embodiment of the invention.

FIG. 4 is a flowchart depicting a method for locating, finding or detecting signals within an image according to an embodiment of the invention. The operations of FIG. 4 may be part of the set of operations described by FIG. 3, but may be used in other methods.

In operation 400, for an image (e.g., an image captured in operation 300 of FIG. 3), a set of candidate windows or areas may be defined or identified. The candidate windows may be for example rectangles or squares, but other shapes may be used. The candidate windows in one embodiment are virtual, digital objects, stored in memory (e.g., memory 120), and are not displayed.

In one embodiment, a horizon is identified in the image though known methods. Regions above the horizon having a likelihood of containing an image of a signal, such as those with a high density of yellow, or other traffic light components or edges, may be identified. In another embodiment regions having a likelihood of containing a signal may be identified based on a prior known or detected signals. One or more windows may be assigned to surround each chosen region. For example, a set of, e.g., ten, different sized and/or shaped template windows may be assigned for the same identified candidate position, and the image region defined by or surrounded by each window may be input into classifier or recognition operation(s) (e.g., a "brute force" method). Other methods of defining candidate windows may be used. In addition, other methods of identifying regions in which to search for signals may be used.

Whether or not each possible window or area is to be used as a candidate windows may be determined in conjunction with, or using as a positive and/or negative weighting, prior signal location data signal as stored in a system or database in, or controlled by, the vehicle (e.g., database 170).

Figure 5:
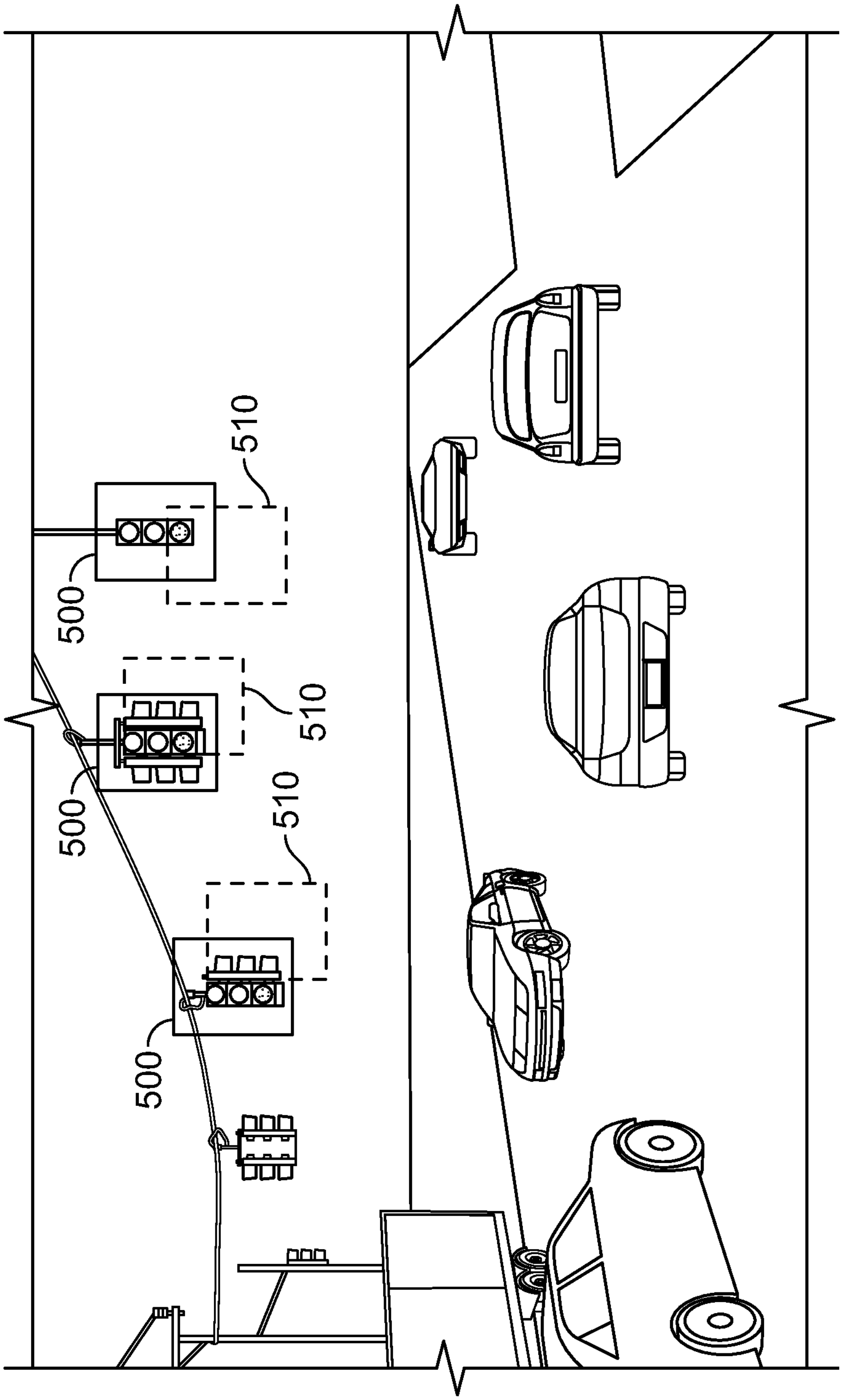
FIG. 5 depicts a view from a camera mounted in a vehicle, with candidate windows added, according to an embodiment of the invention.

FIG. 5 depicts an image taken with a camera mounted in a vehicle, with candidate areas or windows added, according to one embodiment. Candidate windows 500 shown are in one embodiment a subset of candidate windows added to the window. Windows 510 are the positions of traffic signals whose positions have been previously collected by a system associated with the vehicle, and windows or areas 510 may identify or be the basis for a chosen region, which may be used to define candidate windows. For example, for each window or area 510 corresponding to a known or previously identified signal, a set of candidate windows of varying size and position may be created, each candidate window overlapping a window or area 510 (for clarity only a limited number of candidate windows are shown).

Information on the location of signals previously collected by a system in or controlled by the vehicle (e.g., system 100), or information on where signals are projected to be in images, based on past experience, may speed the search within images for signals, or narrow down the search. This may be of benefit in a moving vehicle, where reaction of a driver or vehicle to a traffic light is time sensitive. Positive and negative weighting, or guidance, may be provided by the geographic or 3D location of the signal as stored in a system or database in or controlled by the vehicle.

When regions above the horizon having a likelihood of containing an image of a signal are identified, the geographic location of the identified object in each region may be used to identify whether or not a signal was identified at or near (e.g., within a certain predefined distance) of the location for the object. If a signal was previously identified as being at or near (e.g., within a threshold distance) the location of the object in the region, that region will be more likely to be identified as a candidate region surrounded or defined by one or more candidate areas or windows. If a signal was not previously identified as being at or near the object in the region, that region may be less likely to be identified as a candidate region surrounded by one or more candidate windows.

In order to compare the geographic position of candidate regions with the location of previously identified signals, for each candidate window, the geographical position of objects or the main object represented or imaged in the window may be estimated and assigned. The current vehicle position (and possibly heading or orientation), and the estimated distance and angle of the window relative to the vehicle may be combined to provide this estimation. For example, the vehicle position and heading, and an estimated angle from the horizontal, may be projected onto the image plane. Other methods may be used. Since it is possible that the vehicle is travelling through a previously imaged area in a different position (e.g., a different lane), the determination of the absolute (e.g. geographic) position of objects in the image, and comparison to the position of known signals may aid signal detection.

For example, one or more feature points within the candidate window or area may be identified. As the vehicle moves towards the object imaged in the window, at a set or series of specific vehicle positions, triangulation may be used to estimate the geographic location of the feature point(s). The angle or angles of the line from the camera in the vehicle to each point is calculated (the specific position and angle of view of the camera relative to the GPS center point of the car may be known and used for such calculations). In one embodiment, two angles are used—the elevation from the horizontal, and the left/right angle from the direction of travel of the vehicle and camera (the "yaw"). As the vehicle (and thus the camera) moves towards the object, the calculated angle or angles change (e.g., for each image used to determine the location of the object). The changes of the angle or angles may be combined with the changes in the distance travelled to determine the distance between the camera and the points for any given image using known image processing techniques such as triangulation. The estimated distance from the vehicle maybe combined with the angle or angles from the vehicle to determine the estimated height above and distance from the vehicle and/or geographical location—for example the three dimensional location in absolute terms, typically a three-number coordinate—of the target object in the candidate window. The height above and distance to the vehicle may be relative to a known reference point, such as the camera, or the GPS location of the vehicle.

In operation 410, areas of an image including images of signals (e.g., within candidate areas or windows) may be identified. In one embodiment, signals are identified by analyzing portions of the image, for example surrounded by or defined by candidate windows. For each candidate window, it may be determined whether or not that candidate window includes a signal, and then the outline or pixels corresponding to the signal within the candidate window or area may be determined. In other embodiments, candidate windows need not be used. In one embodiment, candidate windows are identified as surrounding or not surrounding signals using as positive and/or negative weighting, or using as guidance, the geographic, GPS or 3D location of the vehicle in combination with known map data including the known location of intersections (as signals are more likely to exist at intersections) or other areas likely to contain signals. While in one embodiment vehicle location information is used to weight or influence the determination of whether candidate windows contain signals, and separately prior signal data is used to weight or aid in the determination of candidate windows themselves, in other embodiments vehicle location data may be used to pick candidate windows and signal information may be used to determine if candidate windows contain images of signals, or a combination of each input may be used for each determination.

Positive and negative weighting, or guidance, may be provided by intersection information taken from a preexisting or prepared map. Intersections may be identified in such a map as, for example, the meeting of two or more roads, and it may be assumed that signals exist in the vicinity of intersections and that signals do not exist where intersections do not exist. Of course, exceptions occur, so input from such maps may be in the form of a weighting. In other embodiments, weightings may not be used (e.g., absolutes may be used), and such map information need not be used.

Each candidate window may be processed by a series or cascade of steps or classifiers, each identifying different image features and determining the likelihood of the existence of an image of a signal in the image or candidate window. For example, a series of tree-cascaded classifiers may be used. In one embodiment, a Haar-like, histogram orientation of gradient (HOG) features may be computed and an AdaBoost (Adaptive Boosting) algorithm may be used to select features that best discriminate objects from background.

For example,
let the binary $f_p$ be defined as $$f_i = \begin{cases} +1, & \text{If } |p_s - p_v| < D \\ -1, & \text{Otherwise.} \end{cases}$$

with $p_s$ and $p_v$ the position of the signal and subject vehicle and D a distance threshold. An ensemble of weak and efficient detectors (therefore efficient) may be cascaded or executed in cascade. For example, AdaBoost classifiers may be used, designed as the following decision function:

$$F=\text{sign}(w_1f_1+w_2f_2+\ldots+w_nf_n+w_pf_p)$$

where the sign function returns −1 (no object) if the number is less than 0, and +1 (object) if the number is positive. The binary feature value $f_i$ may be defined as, for example:

$$f_i = \begin{cases} +1, & v_i > T_i \\ -1, & \text{Otherwise.} \end{cases}$$

with $v_i$ is a scalar feature descriptor, $v_i>T_i$ indicating the object and a $v_i \le T_i$ indicating no object. $w_i$ represents the strength (e.g. importance) of the feature $f_i$ that may affect the decision of object or no object. Parameters (e.g., $w_i$, $w_p$ and $T_i$) may be learned for example from a labeled training dataset.

The classifier of each node may be tuned to have a very high detection rate, at a cost of many false detections. For example, almost all (99.9%) of the objects may be found but many (50%) of the non-objects may be erroneously detected at each node. Eventually, with a, for example, 20-layer cascaded classifier, the final detection rate may be $0.999^{20}$=98% with a false positive rate of only $0.5^{20}$=0.0001%. The last stage may be for example an HOG, HSV classifier determining, based on input from the previous stages, if a traffic signal exists.

Other or different classifiers may be used, and different orderings of classifiers may be used.

The input to each classifier may be a set of candidate windows and weighting information (such as vehicle location information). Each classifier may, using its own particular criteria, determine which of the input candidate windows are likely to contain signals, and output that set of candidate windows (typically a smaller set than the input set). Each classifier may, for each window, be more likely to determine that the window contains a signal if the vehicle position data in conjunction with known map data indicates the vehicle is at or near an intersection at the time of image capture, or if a position attributed to objects in the candidate window (typically derived from vehicle position) is at or near an intersection at the time of image capture.

In one embodiment the output of the series of classifiers is a set of candidate windows most likely to, deemed to, or determined to, contain signals. In other embodiments, the output of each classifier may be an intermediate yes or no, or one or zero (or other similar output) corresponding to whether or not a signal is predicted to be detected in the window, and the output of the series may be yes or no, or one or zero (or other similar output) corresponding to whether or not a signal is detected in the rectangle. Methods for identifying signals in images other than classifiers or a series of stages may be used.

In operation 420, a signal may be identified within each area or candidate window identified as having or deemed as having a signal. Known object-detection techniques may define within a candidate window where the signal is located. The geographic location of the signal may be determined, e.g. from geographic information computed for window objects in operation 410, or it may be determined for the particular signal, for example using the techniques discussed in operation 410.

In operation 430, an output may be produced. The output may include, for example, an image of each signal detected, or the position of the signal(s) within an image or images, and the geographic location of the signal(s).

Other operations or series of operations may be used. While in the example shown in FIG. 4 information such as vehicle position and previously collected signal information is input into the search process as a weight, signals may be detected with no prior signal information, where previously collected information does not predict signals to be, or where vehicle location information does not predict signals to be.

While in embodiments described above signals are detected, other objects may be detected in images, and their detection accuracy and speed improved, by recording past detection of such objects. For example, traffic signs, bridges, exit ramps, numbers of lanes, road shoulders, or other objects may be detected.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a computer or processor readable storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method comprising:

determining a location of a vehicle;

collecting an image using a camera associated with the vehicle; and analyzing the image in conjunction with the location of the vehicle and in conjunction with previously collected information on the location of traffic signals, collected by a system in the vehicle and relevant to the specific vehicle, wherein the previously collected information is stored in a database or memory within the vehicle, to locate an image of a traffic signal within the collected image;

locating the image of the traffic signal by analyzing portions of the image, wherein the analysis is weighted by the location of the vehicle in conjunction with known map data, and is input to one or more classifiers, each comprising an ensemble of detectors in cascade.

2. The method of claim 1 comprising determining the geographic location of the traffic signal.

3. The method of claim 1 wherein the previously collected information on the location of traffic signals is collected based on images captured by the camera associated with the vehicle.

4. The method of claim 1 comprising updating the previously collected information on the location of traffic signals with the location of the traffic signal.

5. The method of claim 1 comprising locating an image of a traffic signal by creating a set of candidate windows each surrounding a portion of the image wherein the selection of each window is weighted by previously collected information on the location of traffic signals.

6. The method of claim 1 comprising determining the status of the traffic signal.

7. A system comprising:

a database storing previously collected information on the location of traffic signals;

a camera;

a vehicle location detection system; and a controller to:

accept a location of a vehicle from the vehicle location detection system;

collect an image using the camera;

analyze the image in conjunction with the location of the vehicle and in conjunction with the previously collected information on the location of traffic signals, collected by a system in the vehicle and relevant to the specific vehicle, wherein the previously collected information is stored in the database or memory within the vehicle, to locate an image of a traffic signal within the collected image; and wherein the controller is to locate the image of the traffic signal by analyzing portions of the image, wherein the analysis is weighted by the location of the vehicle in conjunction with known map data, and is input to one or more classifiers, each comprising an ensemble of detectors in cascade.

8. The system of claim 7 wherein the controller is to determine the geographic location of the traffic signal.

9. The system of claim 7 wherein the previously collected information on the location of traffic signals is collected based on images captured by the camera.

10. The system of claim 7 wherein the controller is to update the previously collected information on the location of traffic signals with the location of the traffic signal.

11. The system of claim 7 wherein the controller is to locate an image of a traffic signal by creating a set of candidate windows each surrounding a portion of the image wherein the selection of each window is weighted by previously collected information on the location of traffic signals.

12. The system of claim 7 wherein the controller is to determine the status of the traffic signal.

13. A method comprising:

in a vehicle, capturing an image;

searching within a plurality of candidate areas within the image for a traffic signal, wherein the candidate areas are determined using as input, and in conjunction with, previously collected information on the location of traffic signals as stored in a system or database within the vehicle or controlled by the vehicle, and relevant to the specific vehicle;

determining the status of the traffic signal within the image and wherein searching for the traffic signal within the image is weighted by the location of the vehicle, and is input to one or more classifiers, each comprising an ensemble of detectors in cascade.

14. The method of claim 13 comprising determining the geographic location of the traffic signal.

15. The method of claim 13 wherein the information on the location of traffic signals is collected based on images captured in the vehicle.

16. The method of claim 13 comprising updating information on the location of traffic signals with the location of the traffic signal.

17. The method of claim 13 wherein the candidate areas each define a portion of the image wherein the determination of each area is weighted by information on the location of traffic signals.

* * * * *